(12) United States Patent
Prasanna et al.

(10) Patent No.: US 11,021,263 B2
(45) Date of Patent: Jun. 1, 2021

(54) AUTOMATED AIRCRAFT LANDING PERFORMANCE ANALYSIS

(71) Applicant: ROSEMOUNT AEROSPACE INC., Burnsville, MN (US)

(72) Inventors: Ramamurthy Prasanna, Karnataka (IN); Ajay Byappanahalli Sundaramurthy, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 122 days.

(21) Appl. No.: 15/835,492

(22) Filed: Dec. 8, 2017

(65) Prior Publication Data
US 2019/0112073 A1    Apr. 18, 2019

(30) Foreign Application Priority Data
Oct. 12, 2017   (IN) .............................. 201711036323

(51) Int. Cl.
| *B64D 45/04* | (2006.01) |
| *G08G 5/00* | (2006.01) |
| *G07C 5/08* | (2006.01) |
| *G08G 5/02* | (2006.01) |
| *G05D 1/06* | (2006.01) |
| *G07C 5/00* | (2006.01) |

(52) U.S. Cl.
CPC .......... *B64D 45/04* (2013.01); *G05D 1/0676* (2013.01); *G07C 5/008* (2013.01); *G07C 5/0816* (2013.01); *G07C 5/0841* (2013.01); *G08G 5/0021* (2013.01); *G08G 5/02* (2013.01)

(58) Field of Classification Search
CPC ..................................................... B64D 45/04
See application file for complete search history.

(56) References Cited

U.S. PATENT DOCUMENTS

| 7,555,372 B2 | 6/2009 | Dwyer |
| 7,751,951 B2 | 7/2010 | Pitard et al. |
| 7,818,100 B2 | 10/2010 | Goodman et al. |
| 8,165,735 B2 | 4/2012 | Constans |
| 8,195,347 B2 | 6/2012 | Boorman |
| 8,412,434 B2 | 4/2013 | Radó |

(Continued)

FOREIGN PATENT DOCUMENTS

| EP | 2637151 A2 | 9/2013 |
| EP | 3203466 A1 | 8/2017 |

OTHER PUBLICATIONS

European Search Report, Application No. 18199462.5-1203, dated Mar. 15, 2019, 8 pages.

(Continued)

*Primary Examiner* — Kevin P Mahne
(74) *Attorney, Agent, or Firm* — Cantor Colburn LLP

(57) ABSTRACT

Embodiments include techniques for an automated aircraft landing analysis, the techniques includes requesting landing information corresponding to a current landing, wherein the landing information includes historic average landing information, and receiving the landing information. Techniques also include retrieving recorded aircraft system parameters corresponding to the current landing, and calculating a landing distance for the current landing. Techniques include calculating a deviation of the calculated landing distance for the current landing, and displaying results of the calculated deviation.

14 Claims, 6 Drawing Sheets

(56) References Cited

U.S. PATENT DOCUMENTS

| | | | |
|---|---|---|---|
| 8,428,795 B2 | 4/2013 | Caule | |
| 8,773,289 B2* | 7/2014 | Maggiore | G08G 5/0008 340/425.5 |
| 9,008,873 B1 | 4/2015 | Phillips et al. | |
| 9,260,183 B2 | 2/2016 | Rado | |
| 9,310,222 B1* | 4/2016 | Suiter | G01C 23/005 |
| 9,489,851 B1 | 11/2016 | Ross et al. | |
| 9,595,200 B2 | 3/2017 | Krogh et al. | |
| 2005/0261813 A1* | 11/2005 | Ryan | B64C 25/426 701/16 |
| 2010/0079308 A1* | 4/2010 | Fabre | G08G 5/0086 340/951 |
| 2011/0144875 A1* | 6/2011 | Rado | B60T 8/1703 701/70 |
| 2011/0241902 A1 | 10/2011 | Shavit | |
| 2012/0262306 A1* | 10/2012 | Edwards | G08G 5/0013 340/971 |
| 2013/0238173 A1* | 9/2013 | Burns | G08G 5/0021 701/15 |
| 2014/0257601 A1* | 9/2014 | Horne | G01C 23/005 701/16 |
| 2015/0199907 A1* | 7/2015 | Degagne | G08G 5/0021 701/16 |
| 2015/0302753 A1* | 10/2015 | Henderson | G08G 5/02 701/18 |
| 2016/0272344 A1* | 9/2016 | Degagne | B64F 1/20 |
| 2017/0036776 A1* | 2/2017 | He | B64D 43/00 |
| 2017/0162065 A1* | 6/2017 | Scacchi | G05D 1/0676 |
| 2017/0210483 A1* | 7/2017 | Hamblin | B64D 45/00 |
| 2017/0249851 A1* | 8/2017 | Marques | G08G 5/0021 |
| 2018/0102059 A1* | 4/2018 | He | B64D 45/00 |
| 2019/0251852 A1* | 8/2019 | Moll | G08G 5/0021 |

OTHER PUBLICATIONS

EP Office Action dated Dec. 7, 2020; EP Application No. 18199462.5; Filed: Oct. 9, 2018; 5 pages.

* cited by examiner

| Performance Category | Landing Phase | Performance Parameter |
|---|---|---|
| Landing Distance | Not applicable | Deviation w.r.t. regulatory requirements |
| | Not applicable | Deviation w.r.t. in-flight landing distance estimate |
| | Not applicable | Deviation w.r.t. average landing distance based on historic performance under similar conditions |
| Touch Down Quality | Not applicable | Severity of vertical g-force |
| | Not applicable | Deviation from touch down zone |
| Phase-wise performance | Approach | Air Speed |
| | | Vertical velocity |
| | Flare | Flare initiation height |
| | | Flare duration |
| | | Air speed |
| | Touch Down | Vertical velocity just before WoW |
| | | Peak g-value within 5 seconds after touchdown |
| | | Time of nose-wheel touch down since WoW |
| | After landing roll | Time of spoiler deployment since WoW |
| | | Time of thrust reverser deployment since WoW |
| | | Time of wheel brake devices deployment since nose-wheel touch down |
| | | Directional Control (Deviation in aircraft heading w.r.t. runway heading) |

| Landing Phase/Landing Distance Segment | Entry Criteria | Exit Criteria |
|---|---|---|
| Flare | <ul><li>Radio altitude is than H ft</li><li>Transition from negative to positive pitch rate</li><li>Engine is in idle condition</li></ul> | "Weight on Wheels" (WoW) is true |
| Touch down | <ul><li>WoW is true</li><li>Radio Altitude = 0</li></ul> | Radio Altitude = 0<br>Braking devices are fully deployed |
| After landing ground roll | <ul><li>WoW is true</li><li>Braking devices are fully deployed</li></ul> | Ground speed < 20 kmph |

AUTOMATED AIRCRAFT LANDING PERFORMANCE ANALYSIS

CROSS-REFERENCE TO RELATED APPLICATIONS

This application claims the benefit of Indian Application No. 201711036323 filed Oct. 12, 2017, which is incorporated herein by reference in its entirety.

BACKGROUND

The present invention generally relates to analysis tools, and more specifically, to an automated aircraft landing performance analysis.

Aircraft landing performance analysis includes analyzing hard landings and runway overruns. Hard landings are rough, uncontrolled landings which can result from performing landing with greater than normal vertical speed. Runway overruns occur when the aircraft exceeds the length of a particular runway during landing. Hard landings and runway overruns are directly related to aircraft landing performance, and a regular assessment of landing performance is necessary to avoid accidents and/or incidents.

Generally, aircraft landing performance analysis is initiated only when an incident is reported, where the data is used to improve flight safety, operation efficiency and early detection of the maintenance issues. The techniques described herein provide a technique to perform the aircraft landing performance irrespective of a reported incident to provide feedback to optimize the aircraft landing performance.

BRIEF DESCRIPTION

According to one embodiment, a method of an automated aircraft landing analysis, the method includes requesting landing information corresponding to a current landing, wherein the landing information includes historic average landing information, receiving the landing information, retrieving recorded aircraft system parameters corresponding to the current landing, calculating a landing distance for the current landing, calculating a deviation of the calculated landing distance for the current landing, and displaying results of the calculated deviation.

In addition to one or more of the features described above, or as an alternative, further embodiments may include wherein calculating the deviation is based on at least one of federal aviation administration (FAA) regulatory requirements, in-flight landing distance estimate, or historical average performance.

In addition to one or more of the features described above, or as an alternative, further embodiments may include performing a phase-wise analysis to identify deviations in one or more performance parameters, wherein the phase-wise analysis includes an approach phase, flare phase, touchdown phase, and after landing roll phase.

In addition to one or more of the features described above, or as an alternative, further embodiments may include analyzing flight data corresponding to each landing phase, and transmitting a report to a ground server database, wherein the report includes information pertaining to one or more performance parameters.

In addition to one or more of the features described above, or as an alternative, further embodiments may include identifying landing distance data sets corresponding to runway and weather conditions associated with the current landing, calculating average landing distance by averaging landing distance data in the data set, and transmitting the average landing distance.

In addition to one or more of the features described above, or as an alternative, further embodiments may include wherein the ground server includes a database to store landing performance data from an onboard data recorder for each flight of an aircraft.

In addition to one or more of the features described above, or as an alternative, further embodiments may include wherein the request includes runway information and weather information associated with the current landing.

In addition to one or more of the features described above, or as an alternative, further embodiments may include wherein parameters for each phase of the phase-wise analysis is displayed numerically and graphically to a user.

In addition to one or more of the features described above, or as an alternative, further embodiments may include setting configurable alarm limits for the one or more parameters.

Also disclosed is a system for performing an automated aircraft landing analysis, the system includes a storage medium, the storage medium being coupled to a processor, where the processor configured to request landing information corresponding to a current landing, wherein the landing information includes historic average landing information, receive the landing information, retrieve recorded aircraft system parameters corresponding to the current landing, calculate a landing distance for the current landing, calculate a deviation of the calculated landing distance for the current landing, and display results of the calculated deviation.

In addition to one or more of the features described above, or as an alternative, further embodiments may include wherein the processor is configured to calculate the deviation based on at least one of federal aviation administration (FAA) regulatory requirements, in-flight landing distance estimate, or historical average performance.

In addition to one or more of the features described above, or as an alternative, further embodiments may include wherein the processor is configured to perform a phase-wise analysis to identify deviations in one or more performance parameters, wherein the phase-wise analysis includes an approach phase, flare phase, touchdown phase, and after landing roll phase.

In addition to one or more of the features described above, or as an alternative, further embodiments may include analyzing flight data corresponding to each landing phase, and transmitting a report to a ground server database, wherein the report includes information pertaining to one or more performance parameters.

In addition to one or more of the features described above, or as an alternative, further embodiments may include wherein the processor is configured to identify landing distance data sets corresponding to runway and weather conditions associated with the current landing, calculating average landing distance by averaging landing distance data in the data set, and transmitting the average landing distance.

In addition to one or more of the features described above, or as an alternative, further embodiments may include wherein the ground server includes a database to store landing performance data from an onboard data recorder for each flight of an aircraft.

In addition to one or more of the features described above, or as an alternative, further embodiments may include wherein the request includes runway information and weather information associated with the current landing.

In addition to one or more of the features described above, or as an alternative, further embodiments may include wherein parameters for each phase of the phase-wise analysis is displayed numerically and graphically to a user.

In addition to one or more of the features described above, or as an alternative, further embodiments may include wherein configurable alarm limits can be set for the one or more parameters.

BRIEF DESCRIPTION OF THE DRAWINGS

The following descriptions should not be considered limiting in any way. With reference to the accompanying drawings, like elements are numbered alike:

FIG. 4 depicts a report for automated aircraft landing analysis in accordance with one or more embodiments;

FIG. 5 depicts a table for automated aircraft landing analysis in accordance with one or more embodiments.

DETAILED DESCRIPTION

In today's environment, aircraft landing performance analysis is carried out by the airlines post landing. The performance analysis includes the pilot providing personal observations on the landing. Also, airlines may initiate a detailed analysis and take necessary corrective actions if they so choose. Traditionally, the analysis is performed only in cases of major incidents or deviations from the regulatory norms. The regulatory norms can be provided by the federal aviation administration (FAA) guidelines.

In those landing events where there are no major incidents that are reported, deviations in the pilot's performance and aircraft system performance can still exist. In addition, the observations and records provided by the pilot are prone to human errors, verbal communication limitations, and subjective opinions which can lead to inconsistent feedback and analysis.

Figure 1:
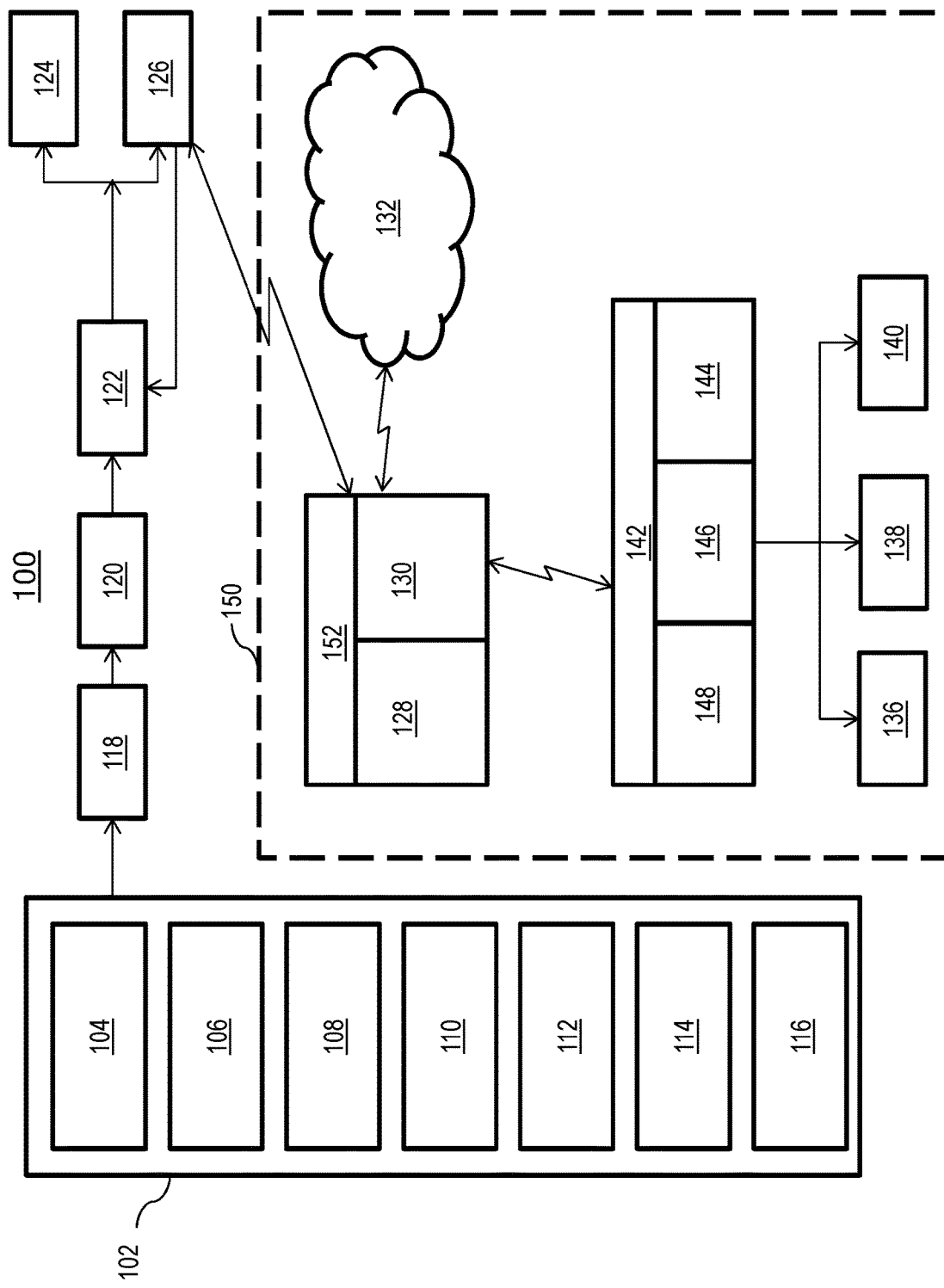
FIG. 1 depicts a block diagram for automated aircraft landing analysis in accordance with one or more embodiments.

Referring to FIG. 1, a system architecture 100 for an aircraft landing performance analysis system (ALPAS) in accordance with one or more embodiments is shown. The system 100 includes an aircraft segment and a ground segment 150.

The aircraft segment includes the aircraft landing performance input system 102. The input system 102 includes one or more onboard sensors/systems with standard avionic communication interfaces to provide the aircraft parameters used in landing performance analysis. For example, the input system 102 includes a radio altimeter 104, air data system 106, navigation system 108, main landing gear system 110, engine system 112, inertial measure system 114, and additional aircraft systems 116. It is to be understood that other systems and/or devices can be used and provided for analysis.

The aircraft segment also includes a data concentrator module 118 which includes a processor/controller based hardware with multiple avionic communication interfaces and a software application for data acquisition and interface control.

A data recorder 120 includes solid state memory devices, and a processor/controller based hardware with input and output communication interfaces and a software application for data recording.

A data processing module 122 includes a processor having input and output communication interfaces and software applications for performing the aircraft landing performance analysis.

A cockpit display system 124 includes a digital display, processor/controller based hardware with input data/video interface and a software application to control the interfaces and the digital display.

A ground server COM system 126 includes a processor/controller based hardware with an input data interface and an output interface module to a datalink and a software application to receive the data from the data processing module and to send/receive the data to/from the ground server through a communication network.

The ground segment 150 includes a communication network 152, cloud services 132 and networked ground servers 142. In one or more embodiments, the communication network 152 includes an airport gateway communication 128 and additional modules 130. Non-limiting examples of the additional modules 130 can include other communications systems such as Wi-Fi, cellular, and the like.

The networked servers 142 include landing performance database 144. The networked servers 142 also includes data analytics framework 146. The networks servers 142 in the ground segment 142 include an average performance analyzer 148. In one or more embodiments, the average performance analyzer 148 calculates the average landing distance for a given weather and runway conditions based on historic landing performance data. The data analytics framework 146 communicates with subsystems including the health monitoring and data analytics 136, maintenance 138, and pilot training 140. Other embodiments can include other systems that are coupled to the networked ground servers 142.

In one or more embodiments, the historic landing performance can be associated with a single pilot, a single aircraft, a single model aircraft, etc. or any combination thereof. It is to be understood that other components such as processors, databases, modules, etc. can be used in the system.

Figure 2:
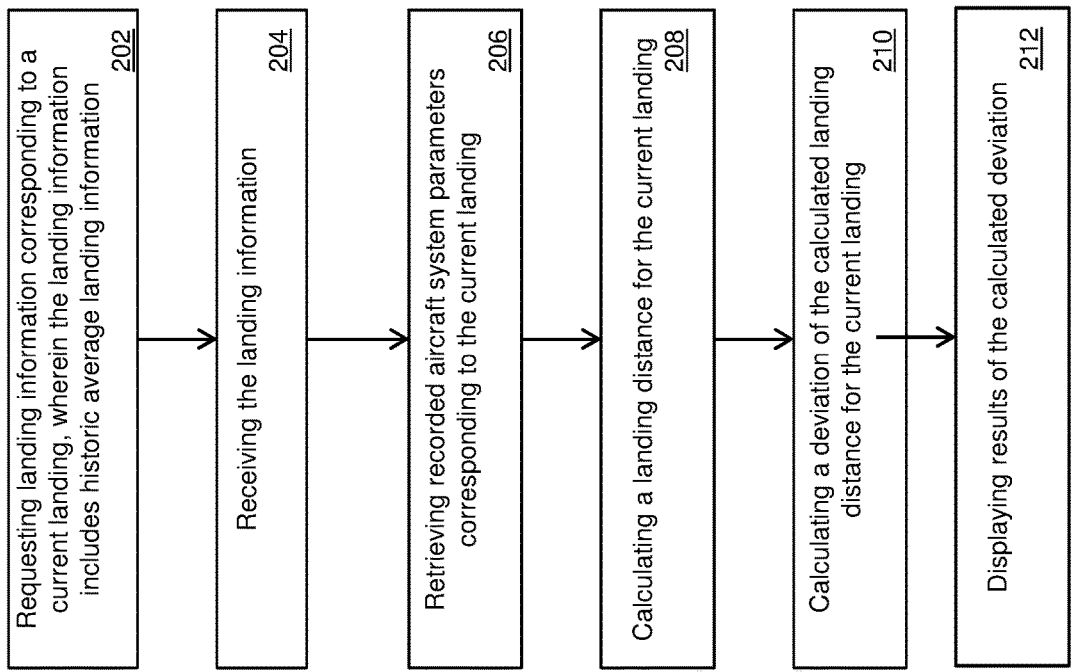
FIG. 2 depicts a flow diagram for automated aircraft landing analysis in accordance with one or more embodiments.

Now referring to FIG. 2, a method 200 for automated aircraft landing analysis in accordance with one or more embodiments is shown. Block 202 provides requesting landing information corresponding to a current landing, wherein the landing information includes historic average landing information.

Block 204 provides receiving the landing information. In one or more embodiments, the historic landing information is received to be compared to the performance of the current landing.

Block 206 provides retrieving recorded aircraft system parameters corresponding to the current landing. In one or more embodiments, the aircraft system parameters include data that was recorded on the aircraft by a data recorder and can be provided to the system 100 as inputs for the analysis. In one or more embodiments, inputs for the landing performance analysis include a plurality of data, measurements, and parameters. In some embodiments, sensor measurements, subsystem status parameters, flight plan data, and computed parameters are used to analyze the aircraft landing performance.

Non-limiting examples of sensor measurement data can include radio altitude, outside air temperature, pressure altitude, air speed, ground speed, vertical speed, aircraft pitch angle, aircraft pitch rate, aircraft roll angle, aircraft heading, aircraft latitude, aircraft longitude, fuel weight, aircraft 3D acceleration vector, etc.

Non-limiting examples of subsystem status parameters can include main landing gear status, nose landing gear status, weight on wheels status, braking control output, braking device deployment status, reverse thruster deployment status, etc.

Data from the flight plan database can be retrieved. This data can include runway heading, runway length, runway threshold latitude-longitude, runway touchdown zone boundaries. Computed parameters can include the in-flight landing distance estimate. It is to be understood that other types of flight and landing data can be used.

Block 208 provides calculating a landing distance for the current landing. In one or more embodiments, the calculation is performed on the aircraft. Block 210 provides calculating a deviation of the calculated landing distance for the current landing. In some embodiments, the deviation for one or more parameters is calculated with respect to FAA regulatory requirements, in-flight landing distance estimates, and historical average performance of an aircraft under similar conditions. In addition, a phase-wise analysis of the landing process can be conducted to identify the deviations in the specific performance parameters. In other embodiments, the quality of the touchdown is analyzed.

Block 212 provides displaying results of the calculated deviation. In one or more embodiments, the results of the report are presented to the pilot through a landing performance application of the aircraft's cockpit display system 124. In other embodiments, the landing performance report is transmitted to a ground server or other external system for storing and further analysis.

Figure 3:
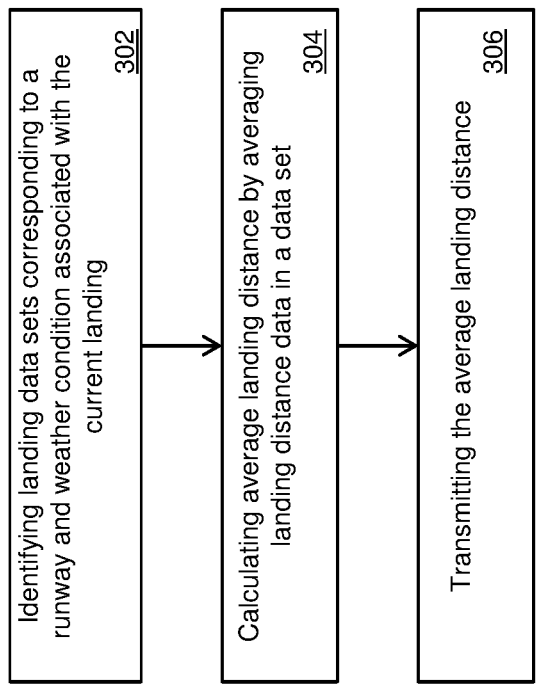
FIG. 3 depicts a flow diagram for automated aircraft landing analysis in accordance with one or more embodiments.

Now referring to FIG. 3, a method 300 for automated aircraft landing analysis in accordance with one or more embodiments is shown.

Block 302 provides identifying landing data sets corresponding to a runway and weather conditions associated with the current landing. The landing data sets can include all landings for a particular aircraft or a particular model aircraft that has been performed on a specific runway. In addition, the landing data sets can limit the landings for the runway based on occurring under the same weather conditions. For example, the weather conditions can indicate windy, snowy, rainy, clear, or other types of conditions which can be used to average the landing distance. In one or more embodiments, the landing data sets are stored in the landing performance database 144.

Block 304 provides calculating average landing distance by averaging landing distance data in a data set. In some embodiments, the average performance analyzer 148 can perform an averaging function for each landing in the data set to determine the average landing distance.

Block 306 provides transmitting the average landing distance. In one or more embodiments, the averaging is performed in a server in the ground segment 150 and is transmitted to a module in the air segment.

Now referring to FIG. 4, a landing performance report 400 in accordance with one or more embodiments is shown. The landing performance report 400 includes a "Performance Category" "Landing Phase" and a "Performance Parameter". It is to be understood that additional information associated with the landing performance can be included in the landing performance report 300.

In the landing performance report 400, the "Performance Category" includes landing distance, touchdown quality, and phase-wise performance information. The "Landing Phase" further describes each segment of the phase-wise performance. The phase-wise performance includes the approach, flare, touchdown, and after landing roll.

The "Performance Parameter" is associated with each "Performance Category" and "Landing Phase." Deviations for the landing distance are based on deviations of the current landing performance from one or more of the FAA regulatory requirements, in-flight landing distance estimate, and average landing distance based on historic performance under similar conditions.

Deviations for touchdown quality include factoring the severity of the vertical G-force experienced by the aircraft and the deviation from touchdown zone. The current landing performance parameter is compared to the allowable ranges established by aircraft manufacturer/FAA regulations and historic averages for each parameter. The feedback is then provided to user based on the comparison and analysis.

The Performance Parameters for each of the phase include a plurality of factors. For example, the Approach phase includes the air speed and vertical velocity parameters. The flare phase includes flare initiation height, flare duration, and air speed parameters. The touchdown phase includes the vertical velocity prior to "WoW", peak g-value within 5 seconds after touchdown, and time of nose-wheel touchdown since "WoW" parameters. The after landing roll phase includes time of spoiler deployments since wow, time of thrust reverser deployment since wow, time of wheel brake devices deployment since nose-wheel touchdown, and direction control (deviation in aircraft heading w.r.t. runway heading) parameters. It is to be understood that other performance categories, phases, and parameters can be used to analyze the landing performance.

Now referring to FIG. 5, Table 500 for an automated aircraft landing analysis in accordance with one or more embodiments is shown. Table 500 describes factors used to distinguish when each phase begins and ends. The phases include the approach phase, the flare phase, the touchdown phase, and the after landing ground roll phase.

The flare phase begins when the radio altitude is less than the height limit. In an embodiment, the flare height limit is a configurable threshold. Also, the flare phase begins as the aircraft pitch transitions from the negative to positive pitch rate and the engine is in the idle position. The flare phase ends when the "weight on wheels" (WoW) status reads true and the radio altitude is 0 ft.

After the flare phase, the touchdown phase begins when the WoW value is true and the radio altitude is 0 ft. The touchdown phase continues until the braking devices of the aircraft are fully deployed.

The after landing ground roll phase begins when the WoW value is true and the braking devices are fully deployed and continues until the ground speed is less than a threshold speed limit (e.g., 20 kmph).

Figure 6:
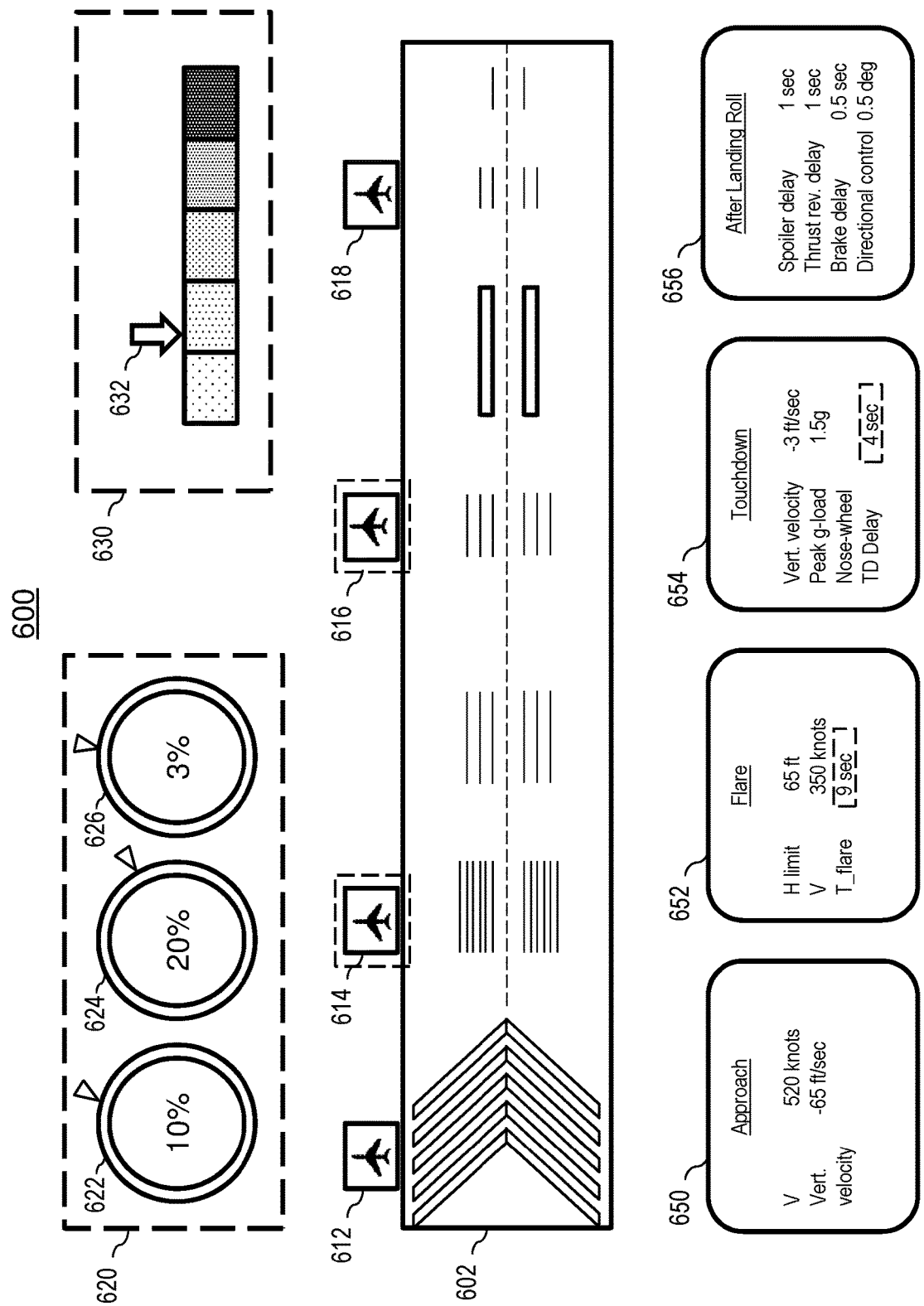
FIG. 6 depicts a user interface for automated aircraft landing analysis in accordance with one or more embodiments.

Referring now to FIG. 6, a GUI 600 for automated aircraft landing analysis in accordance with one or more embodiments is shown. Block 602 provides a graphical representation of the runway associated with the current landing. The representation can be updated as the aircraft performs a landing on different runways having different characteristics. The icon 612 represents the ideal starting point of the approach phase, block 614 represents the ideal starting point of the flare phase, block 616 represents the ideal starting point of the touchdown phase, and block 618 represents the ideal starting point of the after landing roll phase. In some embodiments, each of the icons can be color coded or highlighted to indicate a warning on performance deviations in the respective phase.

Block 620 provides graphical information for the landing distance deviation. For example, the chart 622 can provide the deviation information based on the regulatory information. In this example, chart 622 indicates the 10% deviation of the FAA regulations based for landing distance. The chart 624 provides the deviation information based on the in-flight estimate. In this example, the landing distance is at 20% of its calculated in-flight estimate. The chart 626 provides the deviation information based on the historic information. In this example, the current landing is within 3% of its historic landing distance. Each of the charts can be color coded to indicate whether the landing was within the performance specifications allowed. In other embodiments, various configurable alarm limits can be set to indicate a warning.

Block 630 provides information associated with the touchdown quality. The scale can be color coded to indicate the touchdown quality based on the measured parameters. In this example, the indicator 632 indicates the touchdown quality is in the acceptable range, where the left side of the scale represents a favorable touchdown.

The graphical user interface (GUI) 600 can include the numerical parameter information for each phase 650, 652, 654, and 656 of the current landing measured and/or detected by one or more sensors on the aircraft. In this example, the approach phase 650 includes analyzing the air speed data (V) and vertical velocity information. The air speed is 520 knots and the vertical velocity is −65 ft/sec.

The flare phase 652 includes analyzing the flare initiation height (H), the flare duration (T), and air speed (V). The H is 65 ft, V is 350 knots, and T is 9 seconds. The dotted square around the T parameter indicates this parameter has exceeded its allowable deviation.

The touchdown phase 654 includes analyzing the vertical velocity prior to WoW, peak g-value within 5 seconds after touchdown, and time of nose-wheel touchdown since WoW. In this example indicates the vertical velocity is −3 ft/sec, peak g-load is 1.5 g, and the nose wheel touchdown delay is 4 seconds. The dotted square around the parameter indicates the parameter has exceeded its allowable deviation.

The after landing roll phase 656 includes analyzing the time of spoiler deployment since WoW, time of thrust reverser deployment since WoW, time of wheel brake device deployment since nose-wheel touchdown, and directional control Techniques are provided to regularly detect, analyze, and address landing performance deviations including those deviations that may not result in a major or noticeable incident. In addition, the collected data can be used to validate the pilot's observations and records on the landing performance. The feedback on the landing performance can be provided to the pilot and/or airlines in an efficient manner. The techniques described herein a method and system to improve the landing performance and early detection of aircraft maintenance issues.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for an automated aircraft landing analysis, the method comprising:
   requesting landing information corresponding to a current landing, wherein the landing information includes historic average landing information;
   receiving the landing information;
   retrieving recorded aircraft system parameters corresponding to the current landing;
   calculating a landing distance for the current landing;
   calculating a deviation of the calculated landing distance for the current landing;
   displaying results of the calculated deviation, wherein each phase of the current landing is displayed graphically to a user and includes an illustration of a position of an aircraft of the current landing in relationship to a runway for the current landing, wherein each phase of the current landing is at least one of an approach phase, flare phase, touchdown phase, or after landing roll phase;
   identifying landing distance data sets corresponding to runway and weather conditions associated with the current landing, wherein the data sets correspond to the runway and weather conditions that match the current landing runway and weather conditions, wherein the weather conditions indicate at least one of a windy, snowy, rainy, or clear condition;
   calculating average landing distance by averaging landing distance data in the data set; and
   transmitting the average landing distance.

2. The method of claim 1, wherein calculating the deviation based on at least one of federal aviation administration (FAA) regulatory requirements, in-flight landing distance estimate, or historical average performance.

3. The method of claim 1, further comprising:
   performing a phase-wise analysis to identify deviations in one or more performance parameters, wherein the phase-wise analysis includes an approach phase, flare phase, touchdown phase, and after landing roll phase.

4. The method of claim 1, further comprising:
   analyzing flight data corresponding to each landing phase; and transmitting a report to a ground server database, wherein the report includes information pertaining to one or more performance parameters.

5. The method of claim 1, wherein a ground server includes a database to store landing performance data from an onboard data recorder for each flight of an aircraft.

6. The method of claim 1, wherein the request includes runway information and weather information associated with the current landing.

7. The method of claim 1, further comprising:
setting configurable alarm limits for the one or more parameters.

8. A system, comprising:
a storage medium, the storage medium being coupled to a processor;
the processor configured to:
request landing information corresponding to a current landing, wherein the landing information includes historic average landing information;
receive the landing information;
retrieve recorded aircraft system parameters corresponding to the current landing;
calculate a landing distance for the current landing;
calculate a deviation of the calculated landing distance for the current landing;
display results of the calculated deviation, wherein each phase of the current landing is displayed graphically to a user and includes an illustration of a position of an aircraft of the current landing in relationship to a runway for the current landing, wherein each phase of the current landing is at least one of an approach phase, flare phase, touchdown phase, or after landing roll phase;
identify landing distance data sets corresponding to runway and weather conditions associated with the current landing, wherein the data sets correspond to the runway and weather conditions that match the current landing runway and weather conditions, wherein the weather conditions indicate at least one of a windy, snowy, rainy, or clear condition;
calculate average landing distance by averaging landing distance data in the data set; and
transmit the average landing distance.

9. The system of claim 8, wherein calculating the deviation based on at least one of federal aviation administration (FAA) regulatory requirements, in-flight landing distance estimate, or historical average performance.

10. The system of claim 8, wherein the processor is configured to perform a phase-wise analysis to identify deviations in one or more performance parameters, wherein the phase-wise analysis include an approach phase, flare phase, touchdown phase, and after landing roll phase.

11. The system of claim 8, wherein the processor is configured to:
analyzing flight data corresponding to each landing phase; and
transmitting a report to a ground server database, wherein the report includes performance parameters and the deviation information.

12. The system of claim 8, wherein the ground server includes a database to store landing performance data from an onboard data recorder for each flight.

13. The system of claim 8, wherein the request includes runway information and weather information associated with the current landing.

14. The system of claim 8, the processor is further configured to set configurable alarm limits for the one or more parameters.

* * * * *